United States Patent
Bertuca et al.

(10) Patent No.: US 10,924,642 B2
(45) Date of Patent: Feb. 16, 2021

(54) APPARATUS FOR SECURING A CAMERA TO A POINT-OF-SALE DEVICE

(71) Applicant: Walmart Apollo, LLC, Bentonville, AR (US)

(72) Inventors: Robert Michael Bertuca, Rogers, AR (US); Brandon Matthew Hodges, Bentonville, AR (US); Natasha Lynn Crawford, Cave Springs, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 14 days.

(21) Appl. No.: 16/245,932

(22) Filed: Jan. 11, 2019

(65) Prior Publication Data
US 2019/0215422 A1 Jul. 11, 2019

Related U.S. Application Data

(60) Provisional application No. 62/616,305, filed on Jan. 11, 2018.

(51) Int. Cl.
*H04N 5/225* (2006.01)
*G07G 1/00* (2006.01)
*G03B 17/56* (2021.01)

(52) U.S. Cl.
CPC ......... *H04N 5/2252* (2013.01); *G03B 17/561* (2013.01); *G07G 1/0018* (2013.01); *H04N 5/2251* (2013.01)

(58) Field of Classification Search
CPC .................................................. H04N 5/2256
USPC ....................................... 348/370, 373, 375
See application file for complete search history.

(56) References Cited

U.S. PATENT DOCUMENTS

| | | | | |
|---|---|---|---|---|
| 7,372,503 | B2* | 5/2008 | Maeda | H04N 1/10 |
| | | | | 190/11 |
| 8,559,063 | B1* | 10/2013 | Booppanon | G03B 17/561 |
| | | | | 358/302 |
| 9,992,389 | B1* | 6/2018 | Fu | H04N 5/23241 |
| 2004/0042779 | A1* | 3/2004 | Maeda | G08B 13/19626 |
| | | | | 396/79 |

(Continued)

FOREIGN PATENT DOCUMENTS

CA 2299544 A1 9/2000

OTHER PUBLICATIONS

International Search Report and Written Opinion for Application No. PCT/US2019/013200, dated May 3, 2019, 9 pages.

*Primary Examiner* — Anthony J Daniels
(74) *Attorney, Agent, or Firm* — McCarter & English, LLP

(57) ABSTRACT

Exemplary embodiments provide an apparatus for securing a camera to a Point-of-Sale (POS) device. The apparatus includes an arm assembly having a first arm section and a second arm section. The second arm section is couplable to the first arm section and has a structure that complements the first arm section. The arm assembly is configured for mounting on a light arm of a POS device by securing the first arm section and the second arm section around the light arm using one or more screws. The apparatus also includes a detachable camera housing configured for attaching to a distal end of the arm assembly and for housing a camera. The camera housing has an opening for a lens of the camera. The apparatus further includes a protective layer configured for disposing in the camera housing to protect the lens of the camera.

20 Claims, 16 Drawing Sheets

(56) References Cited

U.S. PATENT DOCUMENTS

| | | | |
|---|---|---|---|
| 2005/0157167 A1* | 7/2005 | Sukenari | H04N 1/0405 348/61 |
| 2007/0145117 A1 | 6/2007 | Throckmorton et al. | |
| 2007/0279519 A1* | 12/2007 | Sukenari | F16M 11/048 348/373 |
| 2008/0087724 A1 | 4/2008 | Kobres et al. | |
| 2009/0010638 A1* | 1/2009 | Chao | G02B 7/02 396/448 |
| 2010/0158310 A1 | 6/2010 | McQueen et al. | |
| 2010/0194973 A1* | 8/2010 | Yamakose | H04N 1/00525 348/373 |
| 2016/0070964 A1* | 3/2016 | Conrad | G07G 1/0018 348/150 |
| 2017/0091579 A1 | 3/2017 | Johnson et al. | |

\* cited by examiner

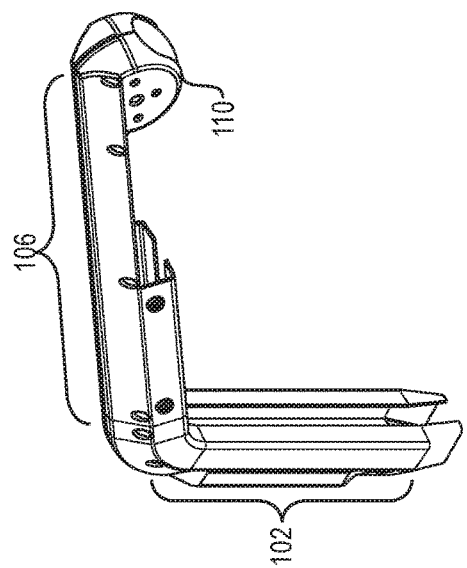
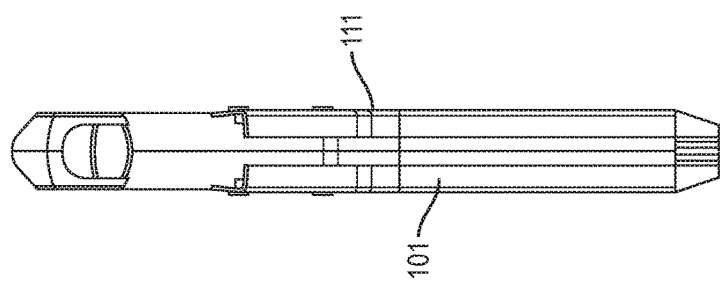
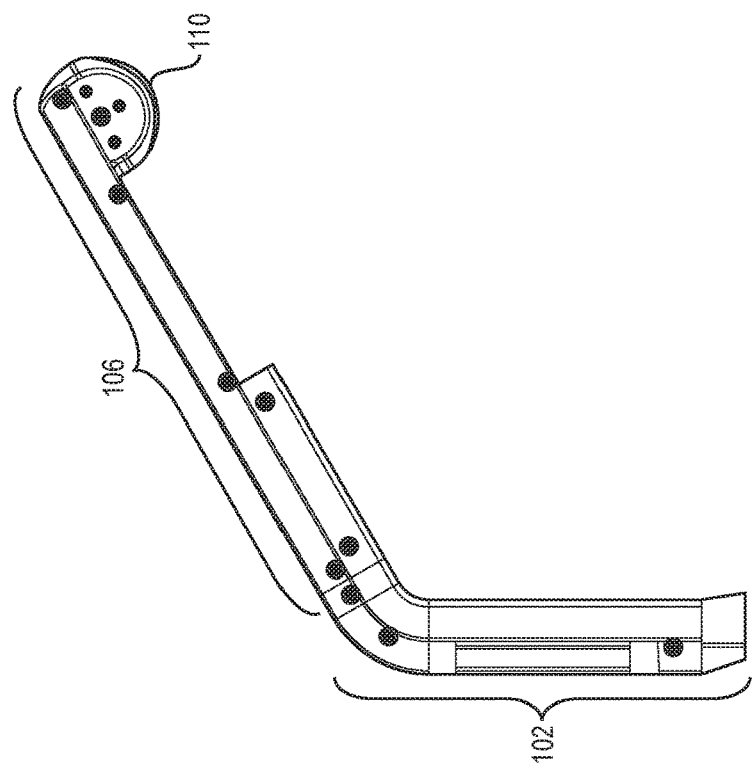
FIG. 8C
FIG. 8B
FIG. 8A

APPARATUS FOR SECURING A CAMERA TO A POINT-OF-SALE DEVICE

CROSS-REFERENCE TO RELATED PATENT APPLICATIONS

This application claims priority to U.S. Provisional Application No. 62/616,305, filed on Jan. 11, 2018, the content of which is hereby incorporated by reference in its entirety.

BACKGROUND

Point-of-Sale (POS) devices are used to facilitate transactions for purchasing goods and services. Some POS devices may be operated by an employee or cashier of the retailer, while other POS devices may be self-operated POS devices where the customer performs the purchase transaction himself. Due to the nature of the transactions occurring at POS devices, many retailers find it desirable or necessary to monitor activity at the POS devices.

SUMMARY

In accordance with embodiments of the present disclosure, an apparatus for securing a camera to a Point-of-Sale (POS) device is provided. The apparatus includes an arm assembly and a detachable camera housing. The arm assembly includes a first arm section and a second arm section, wherein the second arm section is configured to be coupled to the first arm section. The second arm section has a structure that complements the first arm section. The arm assembly is configured for mounting on a light arm of the POS device by securing the first arm section and the second arm section around the light arm using one or more screws. The detachable camera housing is configured for attaching to a distal end of the arm assembly, and it has an opening for the camera lens. A protective layer is provided for disposing in the camera housing to protect the camera lens.

In accordance with embodiments of the present disclosure, a system for providing a camera at a Point-of-Sale (POS) device is provided. The system includes a POS device and an apparatus for securing a camera to the POS device. The POS device includes a platform having a scanning area and a light arm extending upwardly from the platform. The apparatus includes an arm assembly that comprises a first arm section and a second arm section, wherein the second arm section is configured to be coupled to the first arm section. The second arm section has a structure that complements the first arm section. The arm assembly is mounted on the light arm of the POS device by securing the first arm section and the second arm section around the light arm using one or more screws. A detachable camera housing is attached to a distal end of the arm assembly. The camera housing houses a camera and includes an opening for the camera lens. A protective layer is disposed in the camera housing to protect the lens of the camera.

In accordance with embodiments of the present disclosure, a method for securing a camera to a Point-of-Sale (POS) device is provided. The method includes providing a first arm section and providing a second arm section. The second arm section is configured to be coupled to the first arm section and the second arm section has a structure that complements a structure of the first arm section. The method further includes coupling a camera at a distal end of the first arm section of the arm assembly, and mounting the first arm section and the second arm section around a light arm of the POS device to form an arm assembly. The method also includes securing the arm assembly to the light arm using one or more screws, disposing a protective layer in a camera housing, and attaching the camera housing to a distal end of the arm assembly.

BRIEF DESCRIPTION OF THE DRAWINGS

The accompanying figures, which are incorporated in and constitute a part of this specification, illustrate one or more embodiments of the present disclosure and, together with the description, help to explain the present disclosure. The embodiments are illustrated by way of example and should not be construed to limit the present disclosure. In the figures:

FIGS. 8A and 8B illustrate exemplary dimensions of various aspects of the assembled apparatus for securing a camera to a POS device, according to an example embodiment;

FIG. 8C illustrates an assembled apparatus for securing a camera to a POS device, according to an example embodiment;

DETAILED DESCRIPTION

Figure 1:
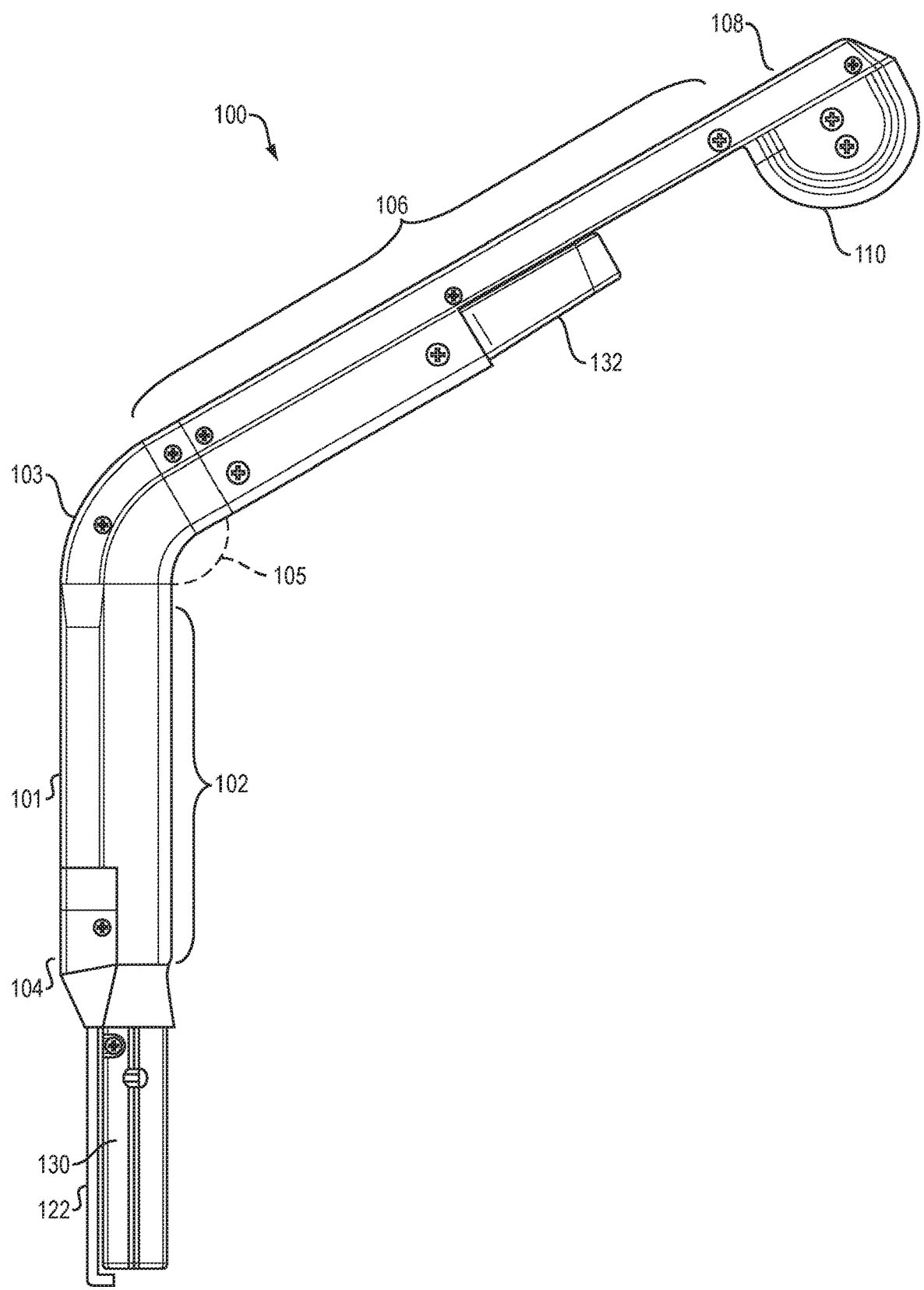
FIG. 1 schematically illustrates a side view of an assembled apparatus securing a camera to a light arm of a Point-of-Sale (POS) device, according to an example embodiment.

Point-of-Sale (POS) devices are used to facilitate transactions for purchasing goods and services. Some POS devices may be operated by an employee or cashier of the retailer, while other POS devices may be self-operated POS devices where the customer performs the purchase transaction himself. Due to the nature of the transactions occurring at POS devices, many retailers find it desirable or necessary to monitor activity at the POS devices to deter or stop fraud or stealing, determine when a user requires assistance, and/or determine a status/condition of the POS devices. In some circumstances, the security camera can be visible to the customers. In such circumstances, the cameras may be more susceptible to vandalism. Exemplary embodiments of present disclosure can be advantageously mounted on and retrofitted to existing POS devices to secure a camera to the POS device. Furthermore, while conventional approaches of mounting cameras in a ceiling may be appropriate in some circumstances, the structure and arrangement of some POS devices can obstruct the field-of-view of the ceiling-mounted cameras preventing the cameras from capturing desired images/video.

Exemplary embodiments described herein relate to an apparatus for securing a camera to a POS device. Exemplary embodiments secure the camera to an existing component, for example a light arm, of the POS device. The camera can be coupled to, integrally formed with, and/or housed by the assembled apparatus and can be secured to the POS device in a manner that is visible to customers. In an example embodiment, the camera is a high-resolution wide angle camera so that high-quality images are obtained using the camera to perform image processing and analysis. To protect the camera lens from damage that may be caused by customers or others, some embodiments provide a protective layer in the camera housing. In an example embodiment, the protective layer can be made of acrylic. In an example embodiment, the protective layer is transparent to allow the camera lens to capture images.

In accordance with embodiments of the present disclosure, the apparatus is provided in the form of an arm assembly. The arm assembly includes a first arm section and a second arm section. The two sections have complementary structures and are configured to fit around a light arm of the POS device. Although the present disclosure describes the arm assembly as having two sections, in some embodiments the arm assembly may be provided in fewer or more than two sections. The first and second arm sections are securable to the light arm using screws. The apparatus can be a clamshell assembly that allows for assembly of the apparatus around the light arm without requiring disassembly of the light arm, or sliding the apparatus onto the light arm and accommodating for the bend in the light arm. In an example embodiment, the arm assembly is made of printed, molded or extruded plastic polymer, such as polyvinyl chloride (PVC), polyethylene polypropylene, acrylonitrile butadiene styrene (ABS) or other suitable material. In an example embodiment, the arm assembly may be manufactured using a 3D printer.

A detachable camera housing portion is provided for housing or holding the camera. The detachably camera housing portion is attached at a distal end of the arm assembly. In an example embodiment, the detachable camera housing portion enables easy adjustment of the camera while the arm assembly is mounted on the light arm of the POS device. That is, the position of the camera lens can be adjusted in-situ so that the desired area of the POS device is in view of the camera, i.e., without having to dismount or disassembly the arm assembly secured to the light arm and without having to remove the camera from the arm assembly.

In an example embodiment, the camera housing is configured to hold or house a ball camera. The camera can be connected to a network and can transmit image data to a server or a computing device via the network. In an example embodiment, the camera has a field of view of approximately 60 degrees. In other embodiments, the camera has a vari-focal field of view in the range of approximately 53 degrees to approximately 99 degrees.

In an example embodiment, the arm assembly includes one or more recesses or channels to house or hold one or more cables within the arm assembly. The arm assembly also includes an electronics enclosure installed in the proximal portion of the arm assembly to facilitate installation of a camera control module (e.g., control image capture of the camera, read image/pixel data from the imager, transmit image/pixel data over the network).

In some embodiments, the POS device is a self-checkout device or a self-checkout POS device, where the customer scans items and performs the purchase transaction himself.

In an example embodiment, the arm assembly is configured to be tightly secured to the light arm to avoid movement or shaking of the camera. The position of the camera enables capture of high quality images without interference or obstruction of the light associated with embodiments of the POS device. In an example embodiment, a portion of the arm assembly is configured to mount above a light of the light arm of the POS device and a portion of the arm assembly including the camera is configured to extend a distance beyond the light, such that interference with the light is avoided.

FIG. 1 schematically illustrates a side view of an apparatus for securing a camera to a Point-of-Sale (POS) device, according to an example embodiment. In exemplary embodiments, the apparatus is provided as an arm assembly 100 that is attachable to a light arm 130 of the POS device. The arm assembly 100 is provided in two sections. A side view of a first arm section 101 is shown in FIG. 1. The first arm section 101 has a proximal portion 102, proximal end 104, distal portion 106, distal end 108, and a transition elbow 103. A length of the proximal portion 102 extends from the proximal end 104 to transition elbow 103 and a length of the distal portion 106 extends from the transition elbow 103 to the distal end 108. The length of proximal portion 102 and the length of the distal portion 106 can extend at an angle 105 relative to each other, where the angle at which the portions 102 and 106 extend can be determined based on the transition elbow 103. In an example embodiment, the angle (an inside angle) can be greater than ninety degrees and less than one hundred eighty degrees. A camera housing portion 110 is attached to, coupled to, or integrally formed with the distal end 108 of the arm assembly 100. The camera housing portion 110 is configured to house or hold a portion of a camera including for example the lens and imaging sensor, while the controller/processor, memory, and other electronics associated with the camera can be disposed at another location (e.g., at the proximal portion 102). The light arm 130 of the POS device includes a light 132. The arm assembly 100 includes a recess or channel for holding one or more cables 122 for operating the camera.

Figure 2:
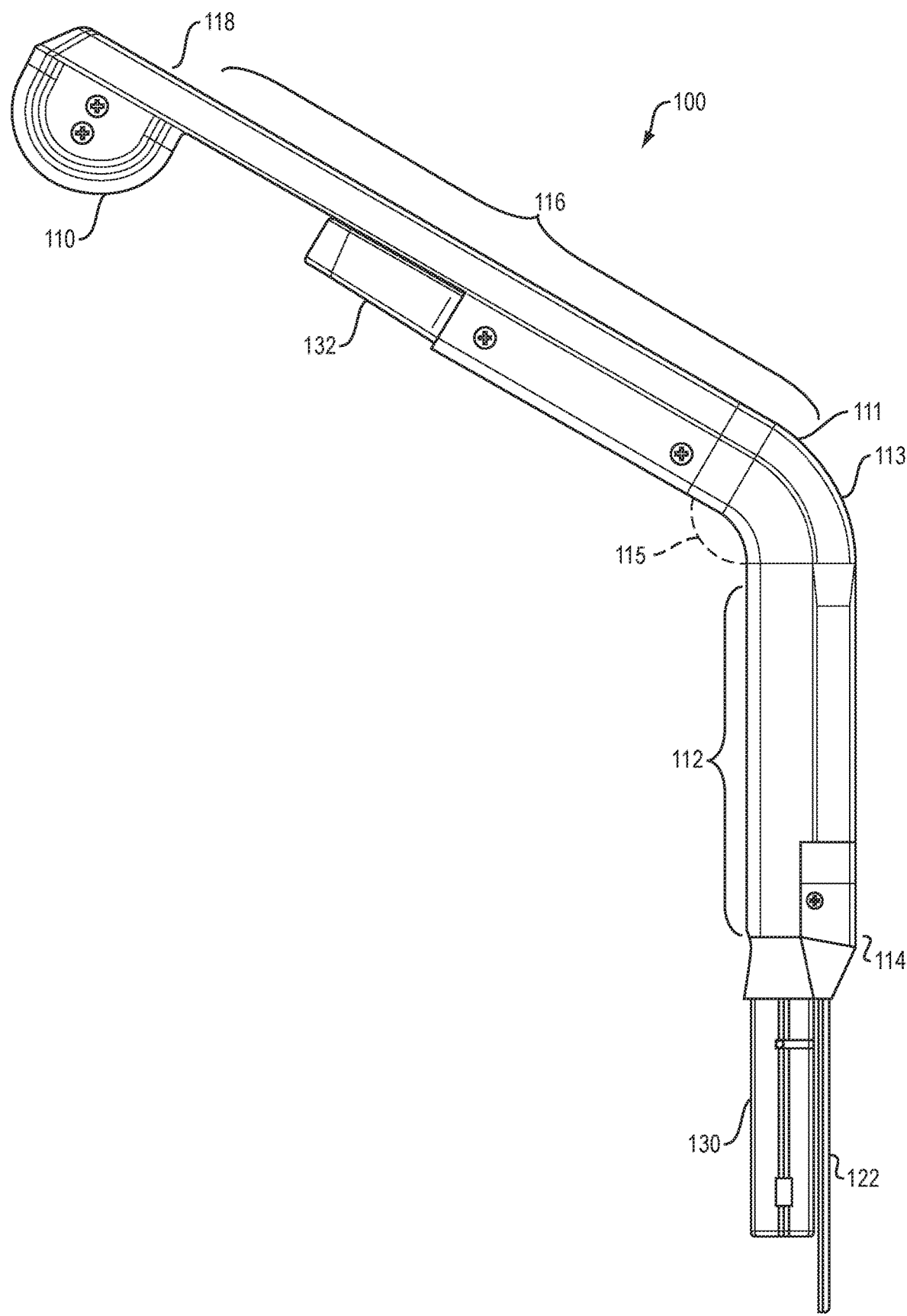
FIG. 2 schematically illustrates another side view of the assembled apparatus securing a camera to a light arm of a POS device, according to an example embodiment.

FIG. 2 schematically illustrates another side view of the apparatus for securing a camera to a POS device, according to an example embodiment. A side view of a second arm section 111 is shown in FIG. 2. The second arm section 111 has a proximal portion 112, proximal end 114, distal portion 116, distal end 118, and a transition elbow 113. A length of the proximal portion 112 extends from the proximal end 114 to transition elbow 113 and a length of the distal portion 116 extends from the transition elbow 113 to the distal end 118. The length of proximal portion 112 and the length of the distal portion 116 can extend at an angle 115 relative to each other, where the angle at which the portions 112 and 116 extend can be determined based on the transition elbow 113. In an example embodiment, the angle (an inside angle) can be greater than ninety degrees and less than one hundred eighty degrees. In exemplary embodiments, the second arm section 111 can be a mirror image of the first arm section 101. A camera housing portion 110 is attached to, coupled to, or integrally formed with the distal end 118 of the arm assembly 100.

Figure 3:
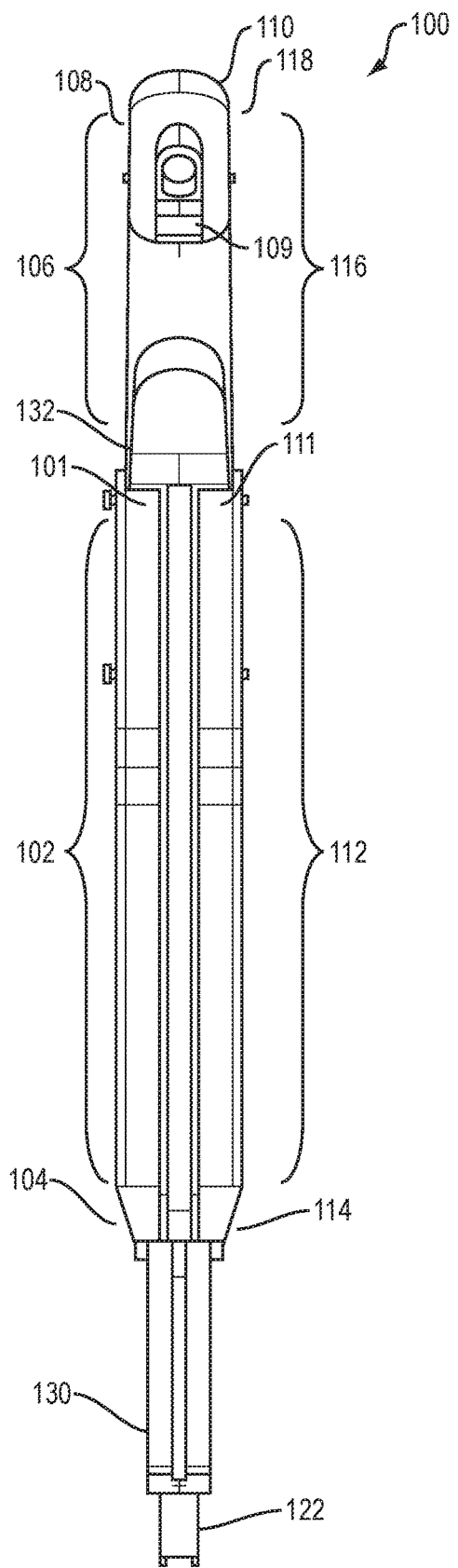
FIG. 3 schematically illustrates a front view of the assembled apparatus securing a camera to a light arm of a POS device, according to an example embodiment.

FIG. 3 schematically illustrates a front view of the arm assembly for securing a camera to light arm of a POS device in an assembled form, according to an example embodiment. As discussed above, the arm assembly 100 is provided in two sections, first arm section 101 and second arm section 111, so that the arm assembly 100 can be easily mounted or retrofitted to an existing light arm of the POS device. FIG. 3 illustrates the first arm section 101 and the second arm section 111 from a front view of the arm assembly 100. The first and second arm sections 101 and 111, respectively, are coupled to each other and mounted on the light arm 130. The first arm section 101 has proximal portion 102, proximal end 104, distal portion 106, and distal end 108. The second arm section 111 has proximal portion 112, proximal end 114, distal portion 116, and distal end 118. The camera housing 110 is attached to, coupled to, or integrally formed with the distal end of the arm assembly 100. The distal end of the arm assembly 100 is formed by the distal ends 108 and 118 of the respective first and second arm sections. The camera housing 110 has an opening 109 so that the lens of the camera disposed in the camera housing 110 has an unobstructed view of a scanning and/or bagging area of the POS device.

Figure 4:
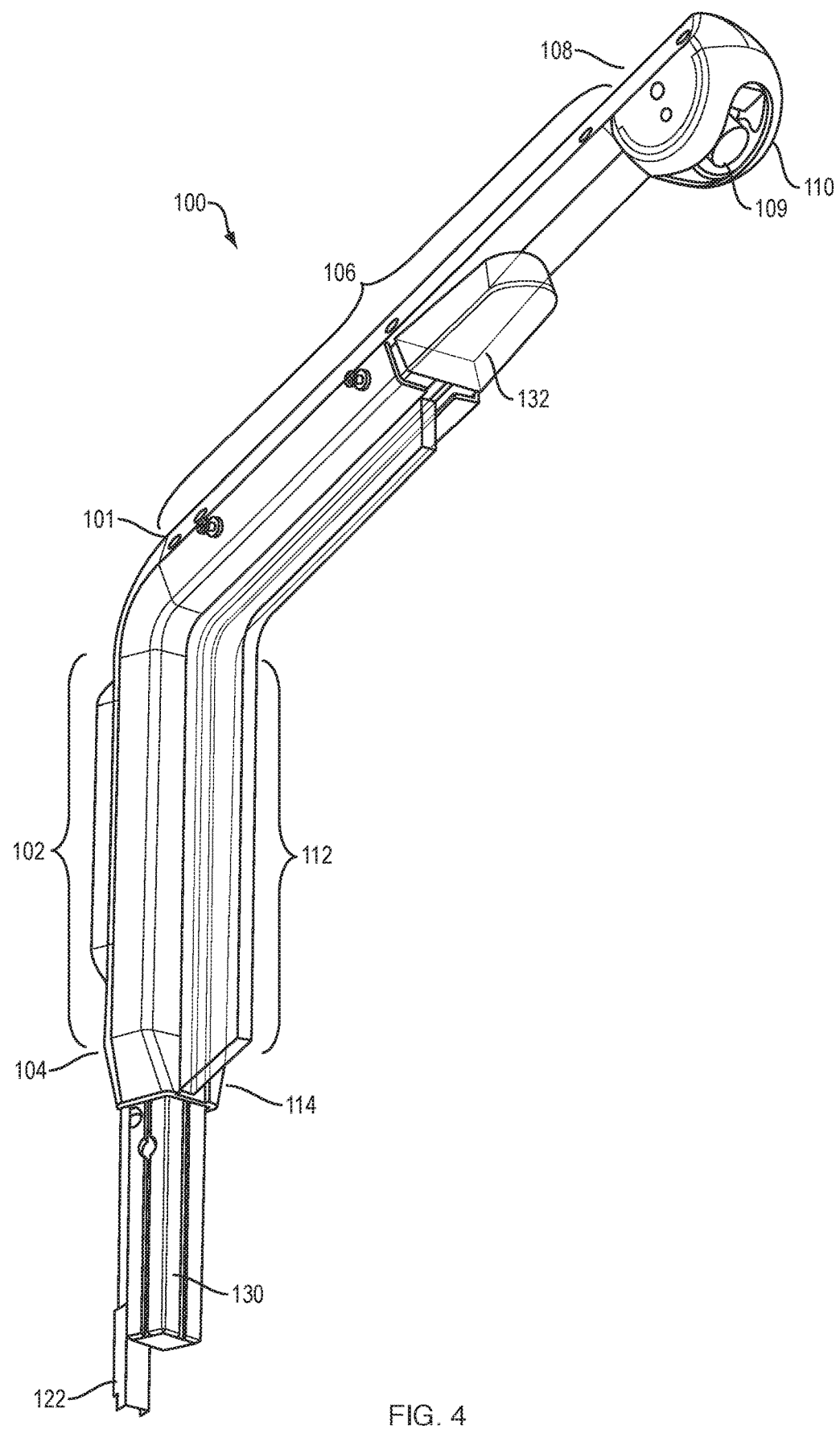
FIG. 4 schematically illustrates an angled perspective view of the assembled apparatus securing a camera to a light arm of a POS device, according to an example embodiment.
Figure 5:
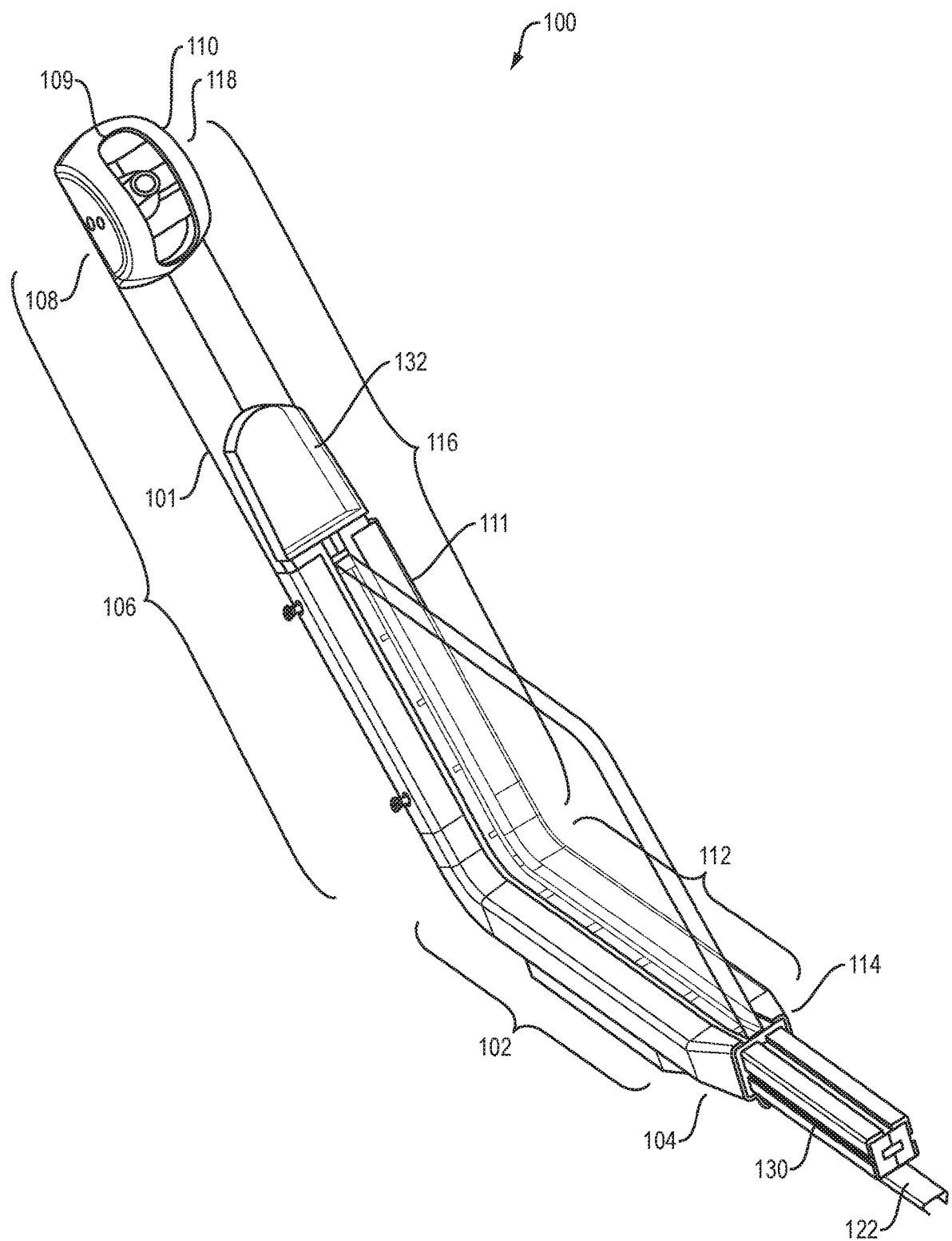
FIG. 5 schematically illustrates a bottom view of the assembled apparatus securing a camera to a light arm of a POS device, according to an example embodiment.

FIG. 4 schematically illustrates an angled perspective view of the assembly arm for securing a camera to a POS device, according to an example embodiment. As described above, the arm assembly 100 can be mounted on the light arm 130 of the POS device. Portions of the first arm section 101 and the second arm section 111 are shown in FIG. 4. FIG. 5 schematically illustrates a bottom view of the apparatus for securing a camera to a POS device, according to an example embodiment. Portions of the first arm section 101 and the second arm section 111 are shown in FIG. 5 from a bottom view of the arm assembly 100 mounted on the light arm 130 of the POS device.

Figure 6:
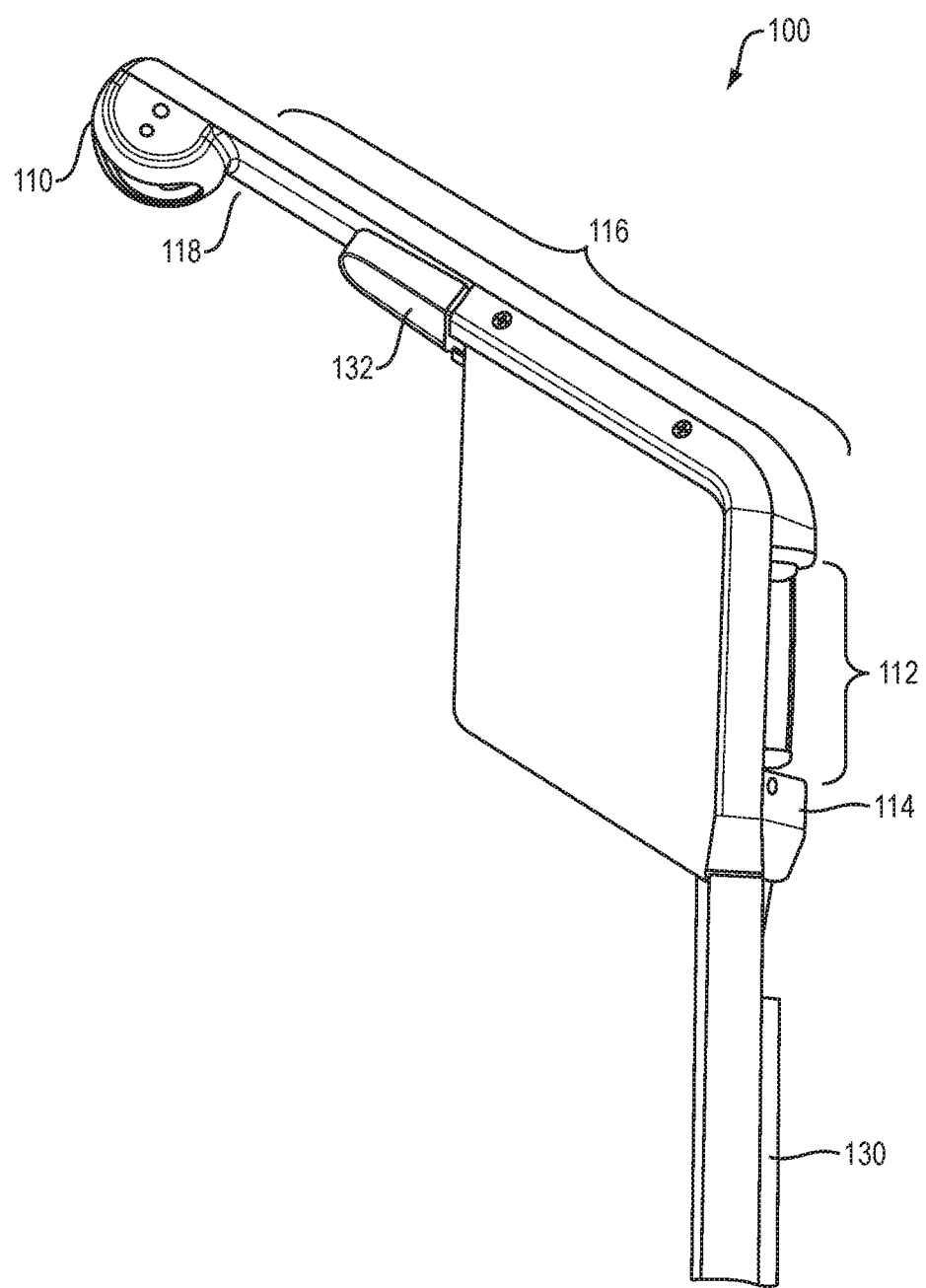
FIG. 6 is an illustration of the assembled apparatus securing a camera mounted on a light arm of a POS device, according to an example embodiment.

FIG. 6 is an illustration of the apparatus for securing a camera mounted on the light arm 130 of a POS device, according to an example embodiment. As described above, the apparatus includes the arm assembly 100. The illustration shows various elements of the arm assembly 100, including the camera housing portion 110, the distal portion 116 of the second arm section 111, the distal end 118 of the second arm section 111, the proximal portion 112 of the second arm section 111, and the proximal end 114 of the second arm section 111. As shown, the arm assembly 100 is mounted on the light arm 130 of the POS device. The light arm 130 includes the light 132. As shown in FIG. 6, the proximal portion 112 of the second arm section (and the proximal portion 102 of the first arm section engages the light arm, and at least a portion of the distal portion 116 of the second arm section (and the distal portion 106 first arm section) engages the light arm 130 when the arm assembly 100 is mounted to the light arm 130 in an assembled state. A portion of the distal portions 106 and 116 of the assembled arm assembly extend beyond the light of the light arm such that the camera housing portion is disposed a specified distance from the light. In some embodiments, the lens of the camera can be in line with the light or can be offset vertically below or above the light.

Figure 7:
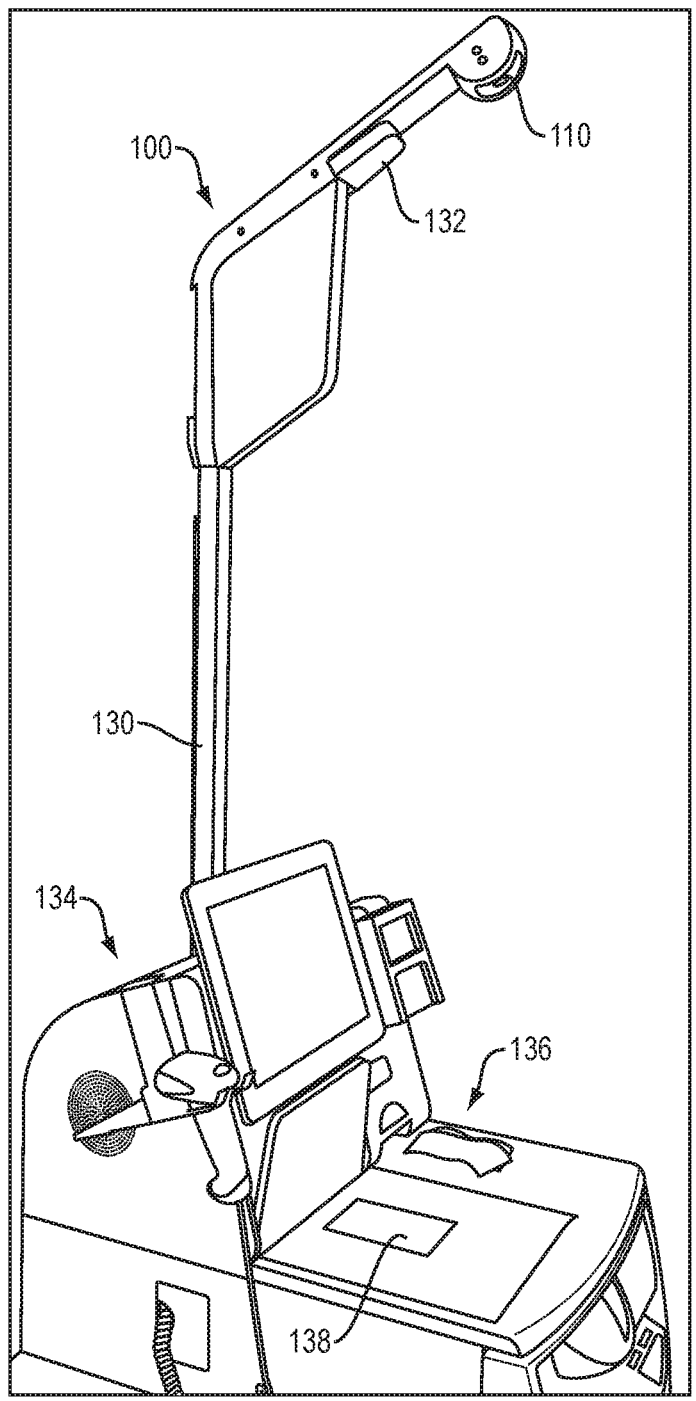
FIG. 7 is another illustration of the apparatus for securing a camera mounted on a light arm of a POS device, according to an example embodiment.

FIG. 7 is another illustration of the apparatus for securing a camera mounted on the light arm 130 of a POS device 134, according to an example embodiment. As shown, the POS device 134 has a platform 136. The platform 136 includes a scanning area 138. The opening in the camera housing 110 is positioned parallel to the scanning area 138, so that the lens of the camera disposed in the camera housing 110 is facing or viewing the scanning area 138 and the field-of-view captured by the camera corresponds to at least the scanning area 138.

FIGS. 8A and 8B illustrate non-limiting example measurements of various aspects of the apparatus for securing a camera to a POS device, according to an example embodiment. In an example embodiment, the length of the proximal portion 102 of the arm assembly 100 is in the range of 5 inches to 25 inches. In the example shown in FIG. 8A, the length of the proximal portion 102 is approximately 14.664 inches. In an example embodiment, the length of the distal portion 106 of the arm assembly 100 is in the range of 10 inches to 30 inches. In the example shown in FIG. 8A, the length of the distal portion 106 is approximately 20.225 inches. In an example embodiment, the depth of the arm assembly 100 is in the range of 2 inches to 8 inches. In the example shown in FIG. 8A, the depth of the arm assembly 100 is approximately 4.008 inches. In an example embodiment, the width of the camera housing 110 is in the range of 1 inch to 6 inches. In the example shown in FIG. 8A, the width of the camera housing 110 is approximately 3.685 inches.

In an example embodiment, the overall height of the arm assembly 100 is in the range of 15 inches to 35 inches. In the example shown in FIG. 8B, the overall height of the arm assembly 100 is approximately 24.335 inches. In an example embodiment, the width of one of the arm sections 101 or 111 is in the range of 0.5 inches to 4 inches. In the example shown in FIG. 8B, the width of the arm sections 101 or 111 is approximately 1.421 inches for a total arm width of approximately 2.842 inches.

In some embodiments, the dimensions of the apparatus may be based on the dimensions of the light arm of the POS device, the dimensions of the camera, location of the scanning area of the POS device, and dimensions or locations of other components. For example, the width of the arm assembly 100 may correspond to the width of the light arm. As another example, the width of the camera housing 110 may correspond to the width or size of the camera.

FIG. 8C illustrates an exemplary arm assembly that is not mounted on a light arm of a POS device.

Figure 9:
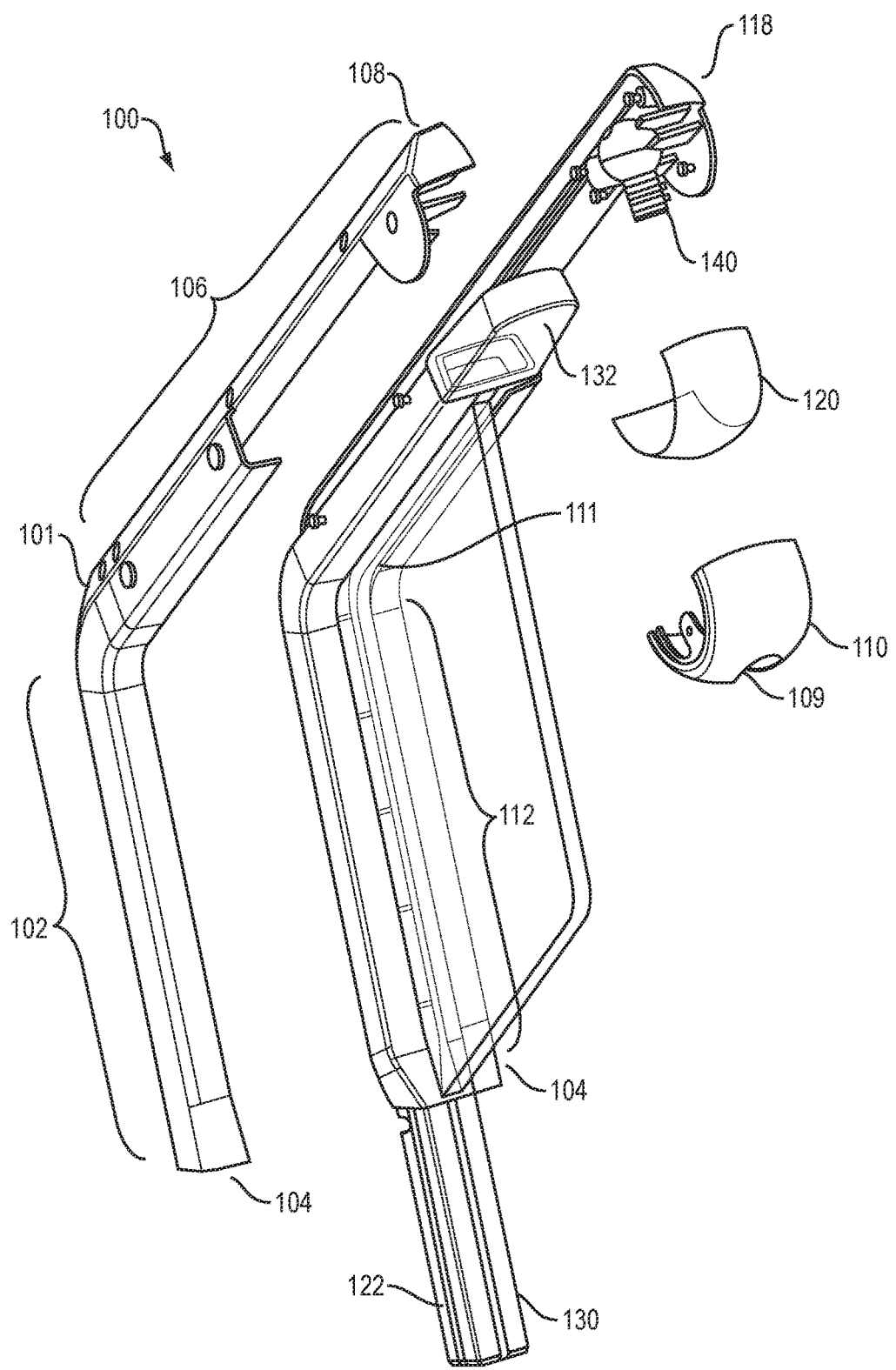
FIG. 9 schematically illustrates an angled exploded view of the apparatus for securing a camera to a POS device, according to an example embodiment.
Figure 10:
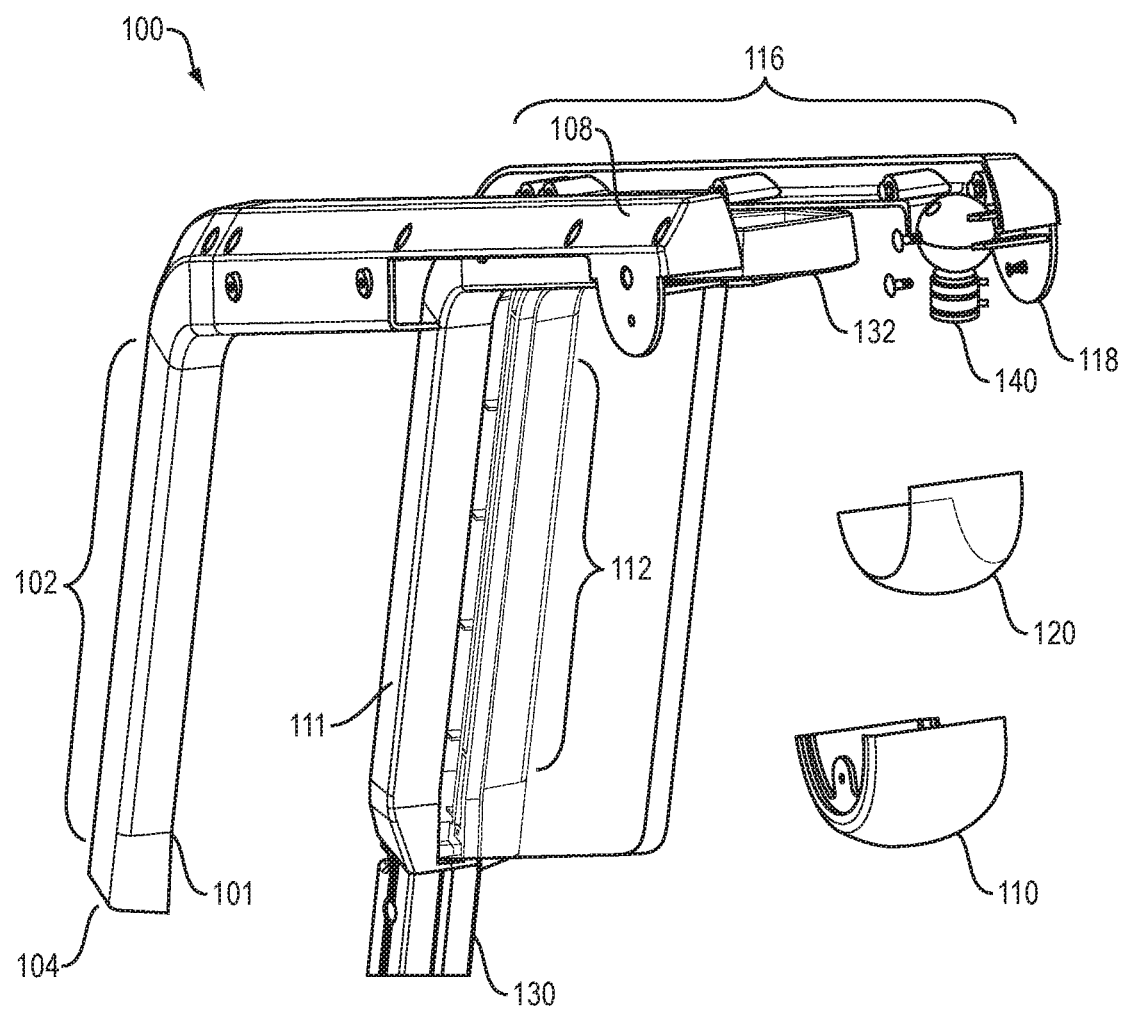
FIG. 10 schematically illustrates a side exploded view of the apparatus for securing a camera to a POS device, according to an example embodiment.

FIG. 9 schematically illustrates an angled exploded view of the apparatus for securing a camera to a POS device, according to an example embodiment. FIG. 10 schematically illustrates a side exploded view of the apparatus for securing a camera to a POS device, according to an example embodiment. FIGS. 9 and 10 show the second arm section 111 mounted on the light arm 130. A camera 140, such as a ball camera, is disposed at the distal end 118 of the second arm section 111. A protective layer 120 is provided for disposing over an opening 109 in the camera housing portion 110 to protect the camera lens from damage. The first arm section 110 is shown prior to mounting on the light arm 130. In the example embodiment, the camera housing portion 110 is removably mountable to the first and second arm sections.

Figure 11:
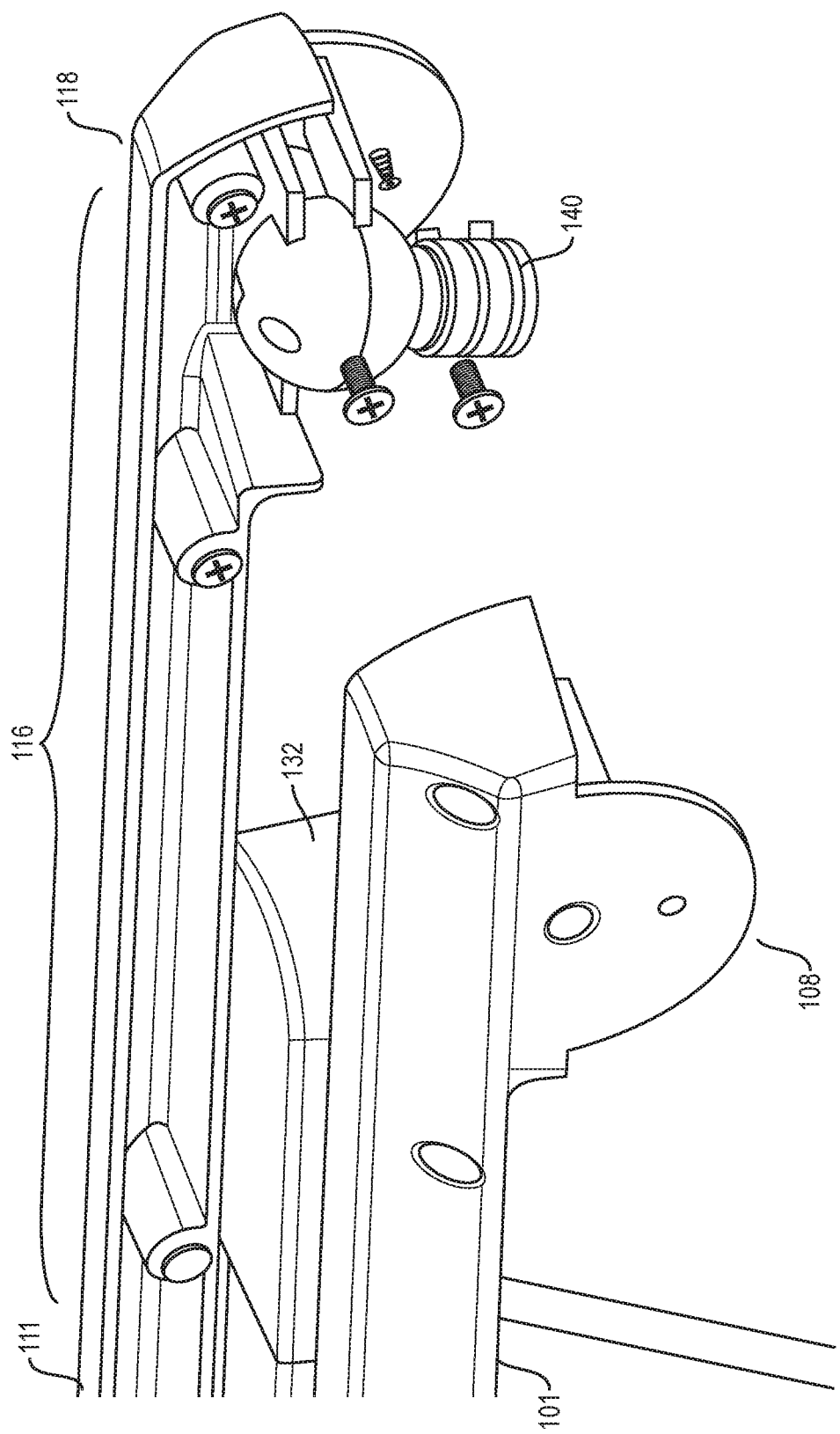
FIG. 11 schematically illustrates a side view of the distal portion of the apparatus for securing a camera to a POS device, according to an example embodiment.

FIG. 11 schematically illustrates a side view of the distal portion of the apparatus for securing a camera to a POS device, according to an example embodiment. FIG. 11 shows the camera 140 disposed or coupled to the distal end 118 of the second arm section 111. As shown, the distal end 118 includes recesses and shelves for coupling to or holding the camera 140. The camera 140 includes a bulbous end that engages with the shelves. In some embodiments, the shelves have cutout portions that correspond to the bulbous shape of the camera 140. The recesses and shelves at the distal end 118 hold the camera 140, while allowing the camera 140 to be rotated/swiveled to adjust an orientation of the camera 140 while its general position is fixed within the camera housing 110. The shelves and recesses at the distal end 118 provide sufficient support to hold the camera 140 in place so that it does not move or shake without application of a certain amount of force to adjust the orientation of the camera. In some embodiments, the camera 140 may be secured to the distal end 118 using fasteners (e.g., screws).

Figure 12:
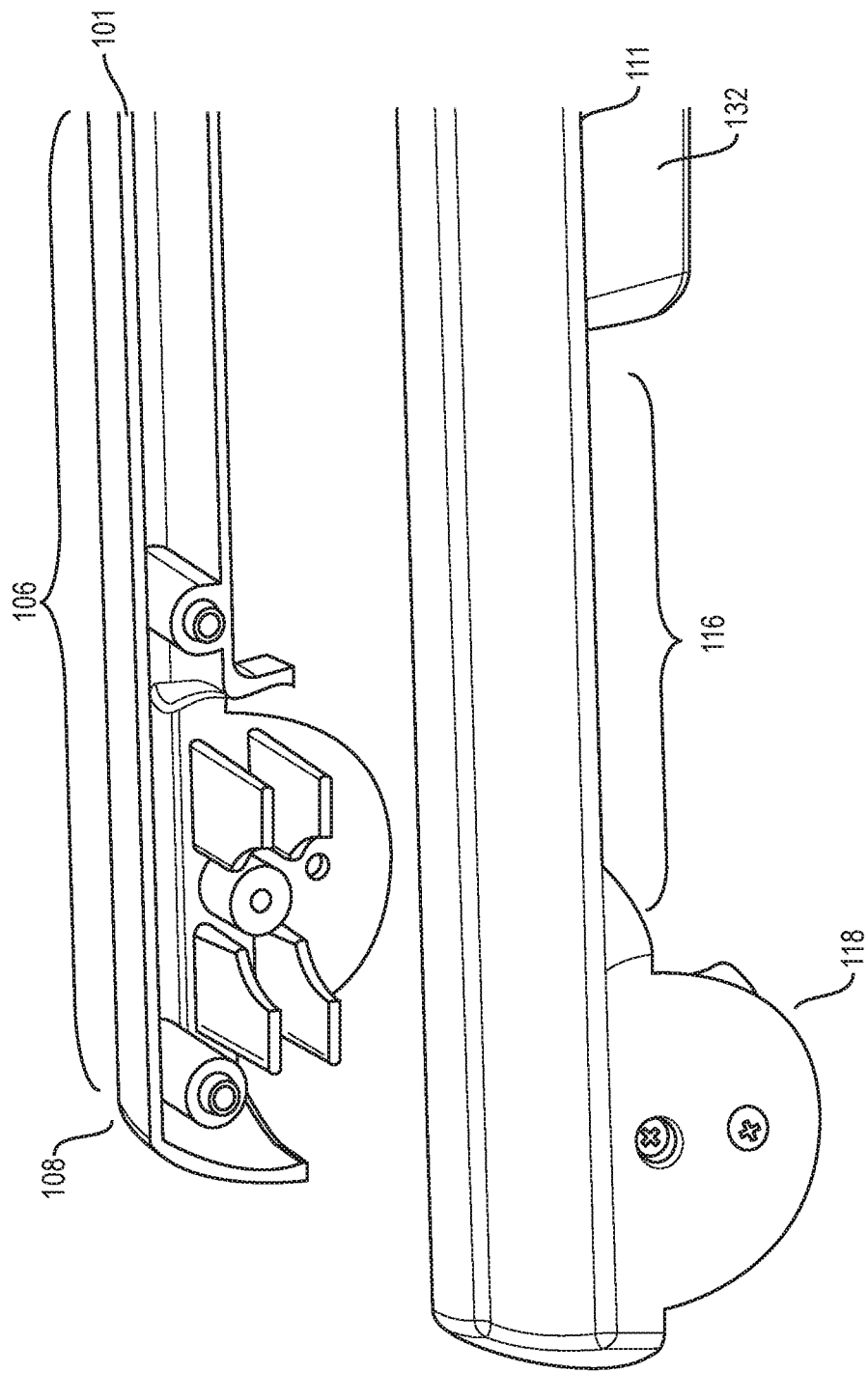
FIG. 12 schematically illustrates a side view of the distal portion of the apparatus for securing a camera to a POS device, according to an example embodiment.

FIG. 12 schematically illustrates a side view of the distal portion of the apparatus for securing a camera to a POS device, according to an example embodiment. FIG. 12 shows the distal end 108 of the first arm section 101. The distal end 108 complements the distal end 118, shown in FIG. 11, and includes recesses and shelves for coupling to or holding the camera 140.

Figure 13:
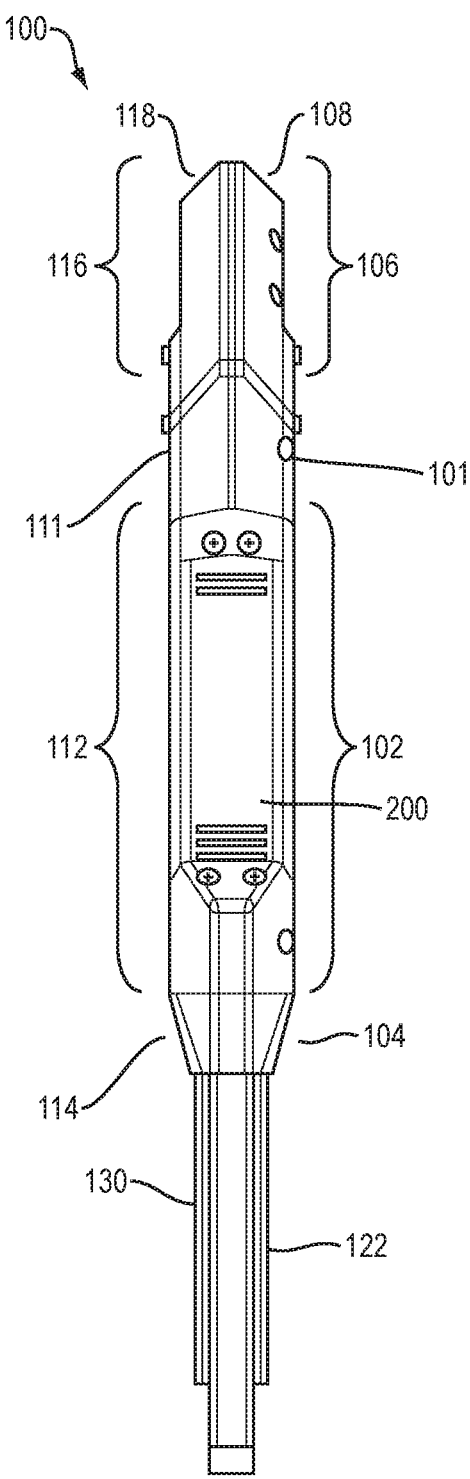
FIG. 13 schematically illustrates a back view of the apparatus for securing a camera to a POS device, according to an example embodiment.

FIG. 13 schematically illustrates a back view of the apparatus for securing a camera to a POS device, according to an example embodiment. As described above, the arm assembly 100 includes the first arm section 101 and the second arm section 111. Various elements of the arm assembly 100 are shown in FIG. 13. FIG. 13 also shows the electronics enclosure box 200 mounted to, coupled to, or integrally formed with the proximal portion of the arm assembly 100. The proximal portion of the arm assembly 100 is formed by the proximal portion 102 of the first arm section 101 and the proximal portion 112 of the second arm section 111. In an example embodiment, each arm section 101, 111 can include and form a portion of the electronics enclosure box 200. In an example embodiment, the electronics enclosure box 200 is integrated into the arm assembly 100. The electronics enclosure box can be configured to hold a camera control module that includes electronic components for capturing the images and transmitting captured images to other device via a network. For example, in an example embodiment, the camera portion disposed at the distal end of the arm assembly can include a lens, sensor (e.g., a charge coupled device (CCD) or C-MOS imager), and a housing for holding the lens and sensor. One or more electrical connections can be formed between the sensor and the camera module. The camera module can include a controller, such as a processor or digital signal processor, a timing generator, memory, analog-to-digital converters, digital-to-analog converters, and a power supply/source. The pixels on the sensor can capture an image and the camera module can export the pixel data from the sensor to the camera module for processing and transmission over the network.

Figure 14:
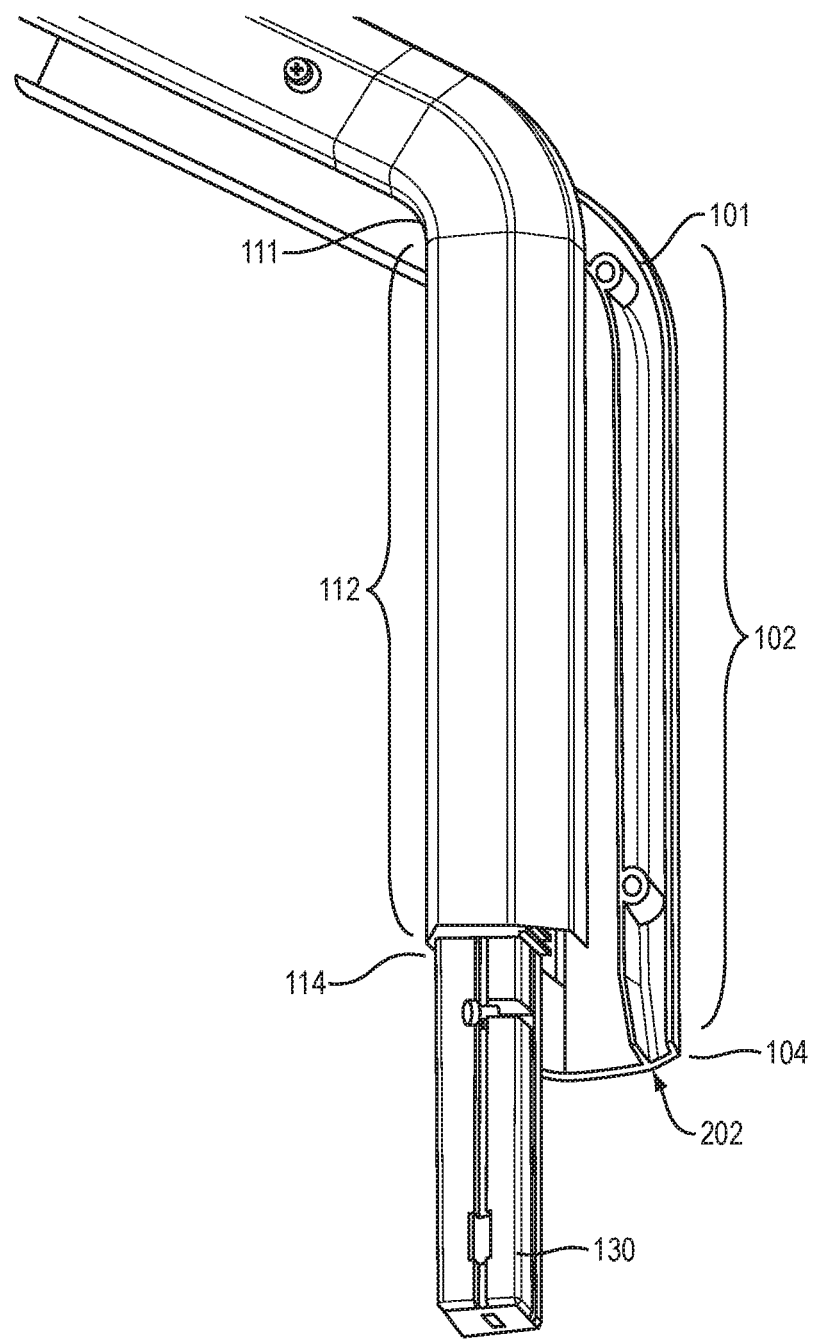
FIG. 14 schematically illustrates a side of the proximal portion of the apparatus for securing a camera to a POS device, according to an example embodiment.

FIG. 14 schematically illustrates an exploded side view of the proximal portion of the apparatus for securing a camera to a POS device, according to an example embodiment. FIG. 14 shows a recess or channel 202 formed in the proximal portion 102 of the first arm section 101 for holding or housing one or more cables 122 (not shown in FIG. 14) used to operate the camera 140 (not shown in FIG. 14) and/or the light of the POS device. A complimentary recess or channel may be provided in the proximal portion 112 of the second arm section 111. As one example, the recesses can hold cables extending between the sensor and the camera module.

Figure 15A:
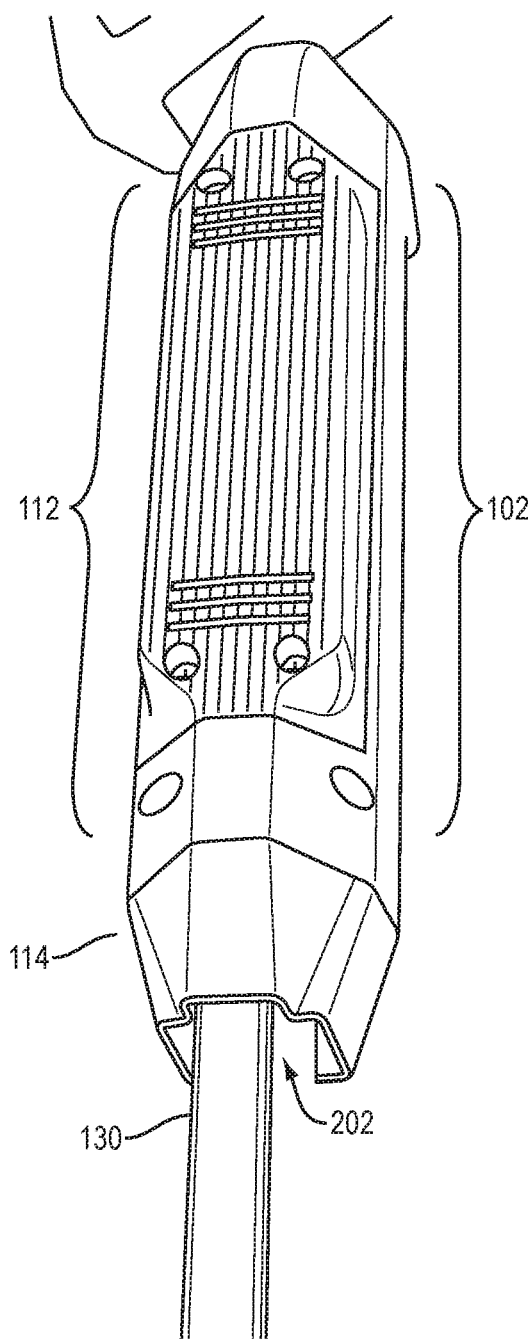
FIGS. 15A and 15B are illustrations of the proximal portion of the apparatus for securing a camera to a POS device, according to an example embodiment.
Figure 15B:
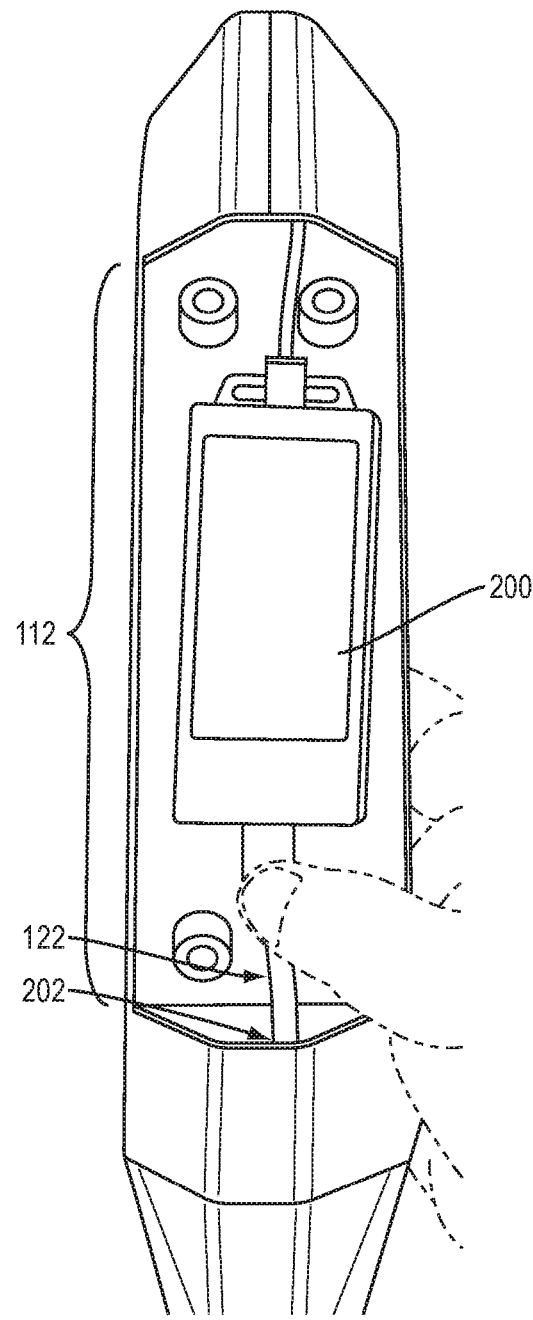

FIGS. 15A and 15B are illustrations of the proximal portion of the apparatus for securing a camera to a POS device, according to an example embodiment. FIG. 15A shows a recess or channel 202 formed in the proximal portions 102 and 112 of the arm assembly 100. FIG. 15B shows cables 122 housed in the recess or channel 202 formed in the proximal portion of the arm assembly 100. FIG. 15B also shows the electronics enclosure box 200 coupled to the proximal portion of the arm assembly.

Figure 16:
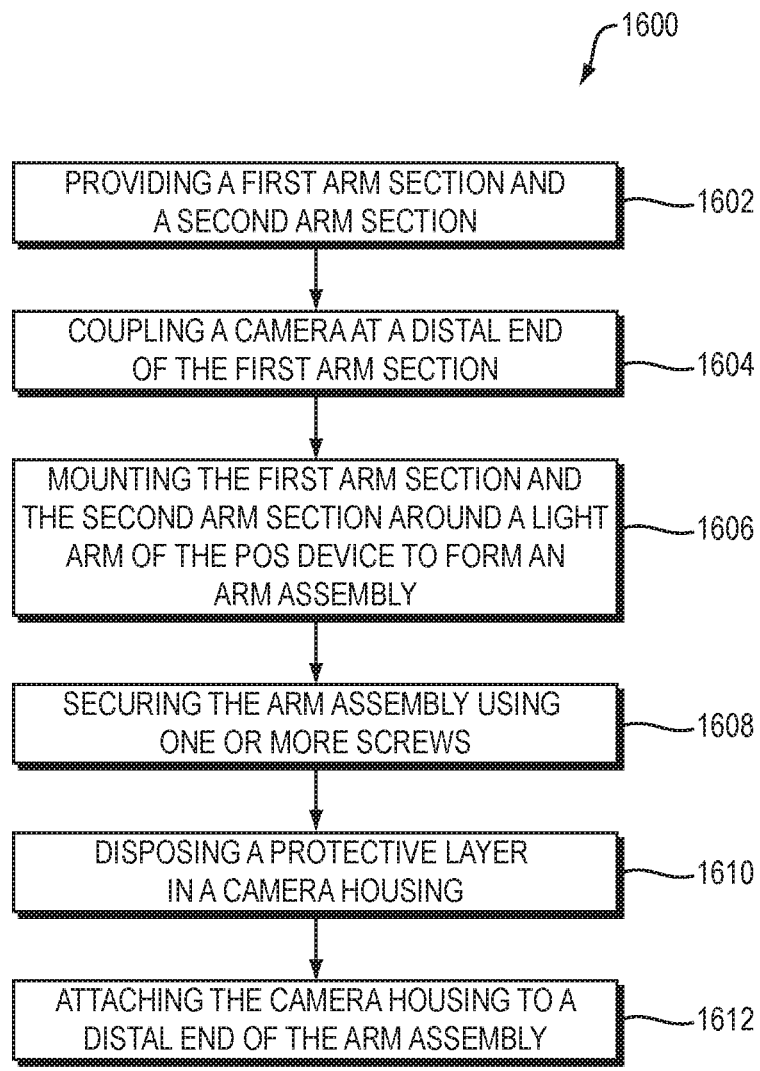
FIG. 16 is a flowchart illustrating an exemplary method for assembling the apparatus for securing a camera to a POS device, according to an example embodiment.

FIG. 16 is a flowchart illustrating an exemplary method 1600 for assembling the apparatus for securing a camera to a POS device, according to an example embodiment. At step 1602, a first arm section and a second arm section are provided. The first arm section and the second arm section may include various features described above (for example, in connection with first arm section 101 and second arm section 111). At step 1604, a camera is coupled to a distal end of the first arm section. For example, as shown in FIG. 11, camera 140 is coupled to the distal end of the arm section 111. At step 1606, the first arm section (with the camera) and the second arm section are mounted around a light arm of the POS device to form an arm assembly (for example, arm assembly 100). At step 1608, the arm assembly is secured to the light arm using one or more screws. At step 1610, a protective layer (for example, protective layer 120) is disposed in a camera housing (for example, camera housing 110) to protect the camera lens from damage. At step 1612, the camera housing is attached to a distal end of the arm assembly covering the camera.

In an example embodiment, the method 1600 further includes coupling or integrating an electronics enclosure box (for example, electronics enclosure box 200) with a proximal portion of the arm assembly. The electronics enclosure box is configured to hold the camera module which facilitates operation of the camera.

In an example embodiment, the method 1600 also includes detaching the camera housing from the distal end of the arm assembly, and adjusting the camera to position the lens of the camera parallel to a scanning area of the POS device.

In this manner, the present disclosure provides an apparatus for securing a camera to a POS device. The apparatus is configured to fit around an existing light arm of the POS device, and securely couples the camera to the light arm to minimize or avoid movement of the camera. Thus, the camera is able to capture high-resolution images for processing and analysis to determine, for example, security issues or issues with the transaction performed at the POS device.

The following description is presented to enable a person skilled in the art to create and use an apparatus for securing a camera to a POS device. Various modifications to the example embodiments will be readily apparent to those skilled in the art, and the generic principles defined herein may be applied to other embodiments and applications without departing from the spirit and scope of the present disclosure. Moreover, in the following description, numerous details are set forth for the purpose of explanation.

However, one of ordinary skill in the art will realize that the embodiments may be practiced without the use of these specific details. In other instances, well-known structures and processes are shown in block diagram form in order not to obscure the description of embodiments with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes multiple system elements, device components or method steps, those elements, components or steps can be replaced with a single element, component or step. Likewise, a single element, component or step can be replaced with multiple elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

What is claimed is:

1. An apparatus for securing a camera to a Point-of-Sale (POS) device comprising:
   an arm assembly comprising:
      a first arm section;
      a second arm section that is a mirror image of the first arm section and configured to be selectively coupled to the first arm section;
      wherein the arm assembly is configured for mounting on a light arm of the POS device by securing the first arm section and the second arm section around the light arm using one or more fasteners;
   a detachable camera housing configured for attaching to a distal end of the arm assembly and for housing a camera, the camera housing having an opening for a lens of the camera; and
   a protective layer configured for disposing in the camera housing to protect the lens of the camera.

2. The apparatus of claim 1, wherein the camera housing is configured for housing a ball camera.

3. The apparatus of claim 1, wherein the detachable camera housing enables adjustment of the camera while the arm assembly is mounted on the light arm of the POS device.

4. The apparatus of claim 1, wherein the arm assembly further comprises a recess to house one or more cables within the apparatus.

5. The apparatus of claim 1, further comprising an electronics enclosure box disposed at a proximal portion of the arm assembly, wherein the electronics enclosure box is configured to hold a camera module that facilitates operation of the camera in the camera housing.

6. The apparatus of claim 1, wherein the arm assembly is configured to be secured to the light arm of the POS device to avoid movement of the camera housing.

7. The apparatus of claim 1, wherein the POS device is a self-checkout device.

8. A system for providing a camera at a Point-of-Sale (POS) device, the system comprising:
   a POS device comprising:
      a platform having a scanning area;
      a light arm extending upwardly from the platform; and
   an apparatus for securing a camera to the POS device comprising:
      an arm assembly comprising:
         a first arm section;
         a second arm section that is a mirror image of the first arm section and configured to be selectively coupled to the first arm section;
         wherein the arm assembly is mounted on the light arm of the POS device by securing the first arm section and the second arm section around the light arm using one or more fasteners;
      a detachable camera housing attached to a distal end of the arm assembly and housing a camera, the camera housing having an opening for a lens of the camera; and
      a protective layer disposed in the camera housing to protect the lens of the camera.

9. The system of claim 8, wherein the opening of the camera housing is parallel to the platform of the POS device and is pointed downwardly towards the scanning area of the platform.

10. The system of claim 8, wherein the camera housing houses a ball camera.

11. The system of claim 8, wherein the detachable camera housing enables adjustment of the camera while the arm assembly is mounted on the light arm of the POS device.

12. The system of claim 8, wherein the arm assembly further comprises a recess to house one or more cables within the apparatus.

13. The system of claim 8, further comprising an electronics enclosure box disposed at a proximal portion of the arm assembly, wherein the electronics enclosure box is configured to hold a camera module that facilitates operation of the camera in the camera housing.

14. The system of claim 8, wherein a length of a distal portion of the arm assembly is based on a location of the scanning area of the POS device.

15. The system of claim 8, wherein the arm assembly is configured to be secured to the light arm of the POS device to avoid movement of the camera housing.

16. The system of claim 8, wherein the light arm comprises a light at a distal end of the light arm.

17. The system of claim 16, wherein the arm assembly is configured to mount around the light and avoid interference with the light.

18. A method for securing a camera to a Point-of-Sale (POS) device, the method comprising:
   providing a first arm section;
   providing a second arm section that is a mirror image of the first arm section and configured to be selectively coupled to the first arm section;
   coupling a camera at a distal end of the first arm section;
   mounting the first arm section and the second arm section around a light arm of the POS device and forming an arm assembly;
   securing the arm assembly to the light arm using one or more screws;

disposing a protective layer in a camera housing, the protective layer configured to protect a lens of the camera; and attaching the camera housing, having an opening for the lens of the camera, to a distal end of the arm assembly.

19. The method of claim 18, further comprising:

supporting a camera module in an electronics enclosure box disposed at a proximal portion of the arm assembly, the electronics enclosure box configured to facilitate operation of the camera.

20. The method of claim 18, further comprising:

detaching the camera housing from the distal end of the arm assembly; and adjusting the camera to position the lens of the camera parallel to a scanning area of the POS device.

* * * * *